United States Patent [19]
Marchionda

[11] Patent Number: 5,525,215
[45] Date of Patent: Jun. 11, 1996

[54] DRAIN TRAP FILTER ASSEMBLY

[76] Inventor: Tony F. Marchionda, 708 5th St., Struthers, Ohio 44471

[21] Appl. No.: 436,744

[22] Filed: May 8, 1995

[51] Int. Cl.⁶ .................................................. B01D 29/35
[52] U.S. Cl. .......................... 210/95; 210/153; 210/447; 210/448; 210/162; 4/292
[58] Field of Search ............................ 210/95, 153, 162, 210/446, 447, 448, 451, 452, 459; 4/292

[56] References Cited

U.S. PATENT DOCUMENTS

| | | | |
|---|---|---|---|
| 1,817,376 | 8/1931 | Izquierdo | 210/447 |
| 2,721,660 | 10/1955 | Woodrow | 210/153 |
| 3,398,830 | 8/1968 | Hornquist | 210/153 |
| 3,465,885 | 9/1969 | Trump | 210/447 |
| 4,164,048 | 8/1979 | Kampfer et al. | 4/292 |
| 4,179,762 | 12/1979 | Barnhardt et al. | 4/191 |
| 4,301,554 | 11/1981 | Wojcicki | 210/447 |
| 4,949,406 | 8/1990 | Canelli | 210/447 |
| 5,241,979 | 9/1993 | Chang | 4/292 |

Primary Examiner—Christopher Upton
Attorney, Agent, or Firm—Harpman & Harpman

[57] ABSTRACT

A drain trap having a T-shaped base portion with a removable filter arranged for visual inspection and cleaning. The filter has a flow-through inspection reservoir insert with a filter cap extending downstream therefrom.

6 Claims, 1 Drawing Sheet

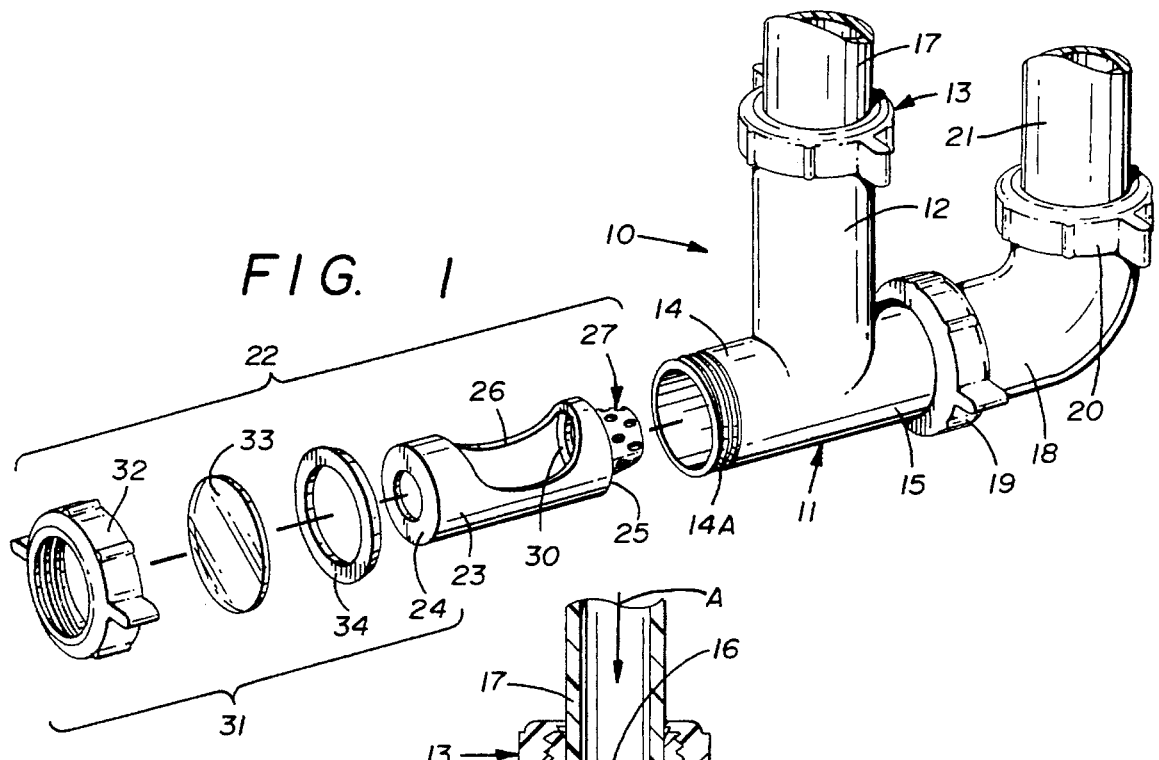
FIG. 1
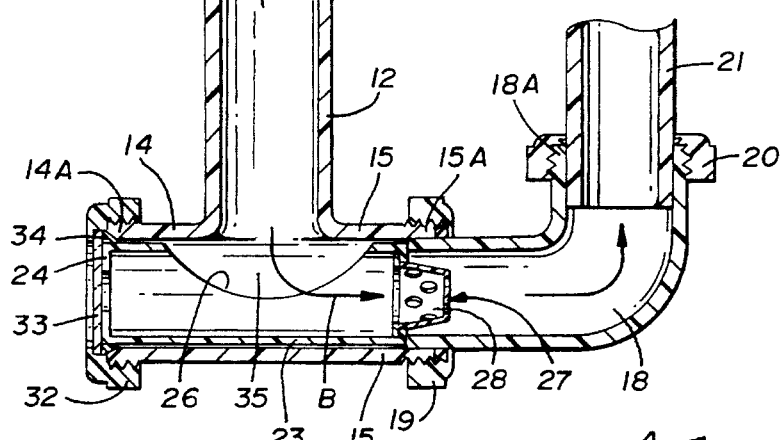
FIG. 2
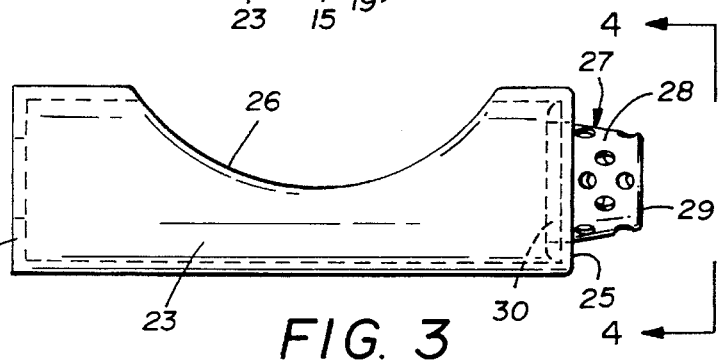
FIG. 3
FIG. 4

DRAIN TRAP FILTER ASSEMBLY

BACKGROUND OF THE INVENTION

1. Technical Field

This device relates to drain traps and the like in plumbing systems for providing a water seal between the drain and the sewer system. In prior art drain traps, they have capture and removal features within to prevent lost objects from passing through the trap into the drain system and beyond as well as providing a filter mechanism to remove clogs from the drainage system.

2. Description of Prior Art

Prior art devices of this type have relied on a variety of different drain trap and cleaning configurations all designed to provide for removal and cleaning of a filter from the drain, see for example U.S. Pat. Nos. 1,817,376, 4,179,762, 4,164,048 and 5,241,979.

In U.S. Pat. No. 1,817,376 a drain strainer is disclosed having a sliding tray removably positioned within the upper portion of the drain trap.

U.S. Pat. No. 4,164,048 is directed to a combination sink trap access port filtration device wherein a U-shaped drain trap has a angular extension within which positions a screen-type filter insert with an access opening and viewport.

U.S. Pat. No. 4,179,762 is directed to a trap having a cylindrical base portion with a filter disk positioned within.

In U.S. Pat. No. 5,241,979 an elbow pipe structure is shown having a extension cap and filter assembly threadably extending therefrom at the lowest point of the elbow structure.

SUMMARY OF THE INVENTION

A drain trap assembly having a T-shaped base portion with a removable filter assembly positioned within. An optical access viewing and removing cap provides for viewing and removability of a cylindrical pre-filter reservoir with a filter element extending downstream therefrom.

DESCRIPTION OF THE DRAWINGS

FIG. 1 is an exploded perspective view of the filter trap of the invention;

FIG. 2 is a cross-sectional view of the assembled filter trap of the invention;

FIG. 3 is an enlarged side elevational view of a filter reservoir insert; and

FIG. 4 is an end view on lines 4—4 of FIG. 3.

DESCRIPTION OF THE PREFERRED EMBODIMENT

Referring to FIGS. 1 and 2 of the drawings, a drain trap assembly 10 can be seen having a T-shaped portion 11 comprising an upstanding leg portion 12 with a compression ring and gasket assembly 13 and a cylindrical base portion 13A with oppositely disposed end openings 14 and 15 which are externally threaded at 14A and 15A respectively. The leg portion 12 is of a sufficient open dimension at 16 to accept the insertion of a drain line 17 from a sink facility or the like drain, not shown, as will be well understood by those skilled in the art.

An elbow fitting 18 is threaded at 18A and compressively sealed to the extending end opening 15 of the cylindrical base portion 13A and is thus so positioned to define the required U-shaped water seal trap of a drain trap configuration. The elbow fitting 18 has compression gasket and ring assemblies 19 and 20 on each end to secure same to the end opening 15 of the cylindrical base portion 13A and an outlet drain line 21 respectively.

A filter and access viewing assembly 22 for removably positioning within the cylindrical base portion 13A is comprised of a filter mounting cylindrical insert, best seen in FIGS. 1 and 3 of the drawings having a main tubular body member 23 with inturned apertured ends 24 and 25. The tubular body member 23 has an arcuate longitudinally extending notch within at 26 between said respective inturned apertured ends 24 and 25. A filter basket 27 having a cylindrical apertured sidewall 28 and integral apertured bottom 29 extends outwardly through said inturned apertured end 25. The filter basket 27 has an out-turned annular flange 30 extending from the perimeter edge of the cylindrical sidewall 28 for registering engagement with the internal surface of the apertured end 25.

A sealing end cap and viewport assembly 31, best seen in FIG. 1 of the drawings, comprises a threaded annular compression ring 32 having an optically clear disk 33 within and a resilient compression gasket 34. The gasket 34 is engageable over the end 24 of the tubular body member 23 which provides with the compression ring 33 a compression seal and axle alignment between the sealing end cap view portion assembly 31 and the filter mounting cylindrical insert within the cylindrical base portion 13A of the T-shape portion 11.

The alignment of the cylindrical insert position's notch at 26 is in vertical relation with the upstanding leg portion 12 and its associated drain inlet as hereinbefore described. The tubular insert 23 seated within the cylindrical base portion 13A with the sealing end cap and viewport assembly 31 defines a drain inlet reservoir 35 therein whose outlet as indicated by an arrow B is filtered by the filter basket 27 as hereinbefore described.

In use, liquids flow downwardly as shown by arrow A through the drain line 17 into the drain trap 10 via the upstanding leg 12 through the drain inlet reservoir 35 and filter basket 27 upwardly through the elbow 18 and out via the outlet drain line 21.

It will be evident that any valuable item inadvertently dropped into the drain trap can be seen through the end cap viewport assembly and retrieved by removal of same and the cylindrical insert 23 with the attached filter basket 27 which will capture the object within the drain inlet reservoir 35. Additionally, drain clogs formed by intrained residue in the drain fluid are trapped by the filter basket 27 and can easily be removed by the same action.

It will be apparent to those skilled in the art that various changes and modifications may be made therein without departing from the spirit of the invention.

While the above specification contains many specificities these should not be construed as limitations on the scope of the instant invention, but rather as an exemplification of the preferred embodiments thereof. Accordingly, the scope of the instant invention should not be determined by the embodiment shown, but rather by the claimed appended hereto and their legal equivalence.

Therefore I claim:

1. A drain trap assembly comprising, a generally U-shaped hollow body assembly comprising, a T-shaped portion and a curved outlet portion, said T-shape portion comprises, an upstanding inlet leg and a cylindrical base portion having oppositely disposed end openings therein, a cylindrical insert removably positioned in said cylindrical base portion, said cylindrical insert having an elongated notch within, a filter basket extending outwardly from one end of said cylindrical insert, a sealing cap and viewport assembly removably secured to one of said cylindrical base openings and said curved outlet portion being secured to the other of said openings, and means for annular alignment of said cylindrical insert within said cylindrical base portion such that said notch communicates with said inlet leg and said filter basket is positioned between said inlet leg and said outlet portion.

2. The drain trap of claim 1 wherein said cylindrical insert has inturned apertured ends.

3. The drain trap of claim 1 wherein said filter basket has a cylindrical apertured sidewall with an integral apertured bottom, an annular flange extending outwardly from said sidewall for registering engagement within said cylindrical insert.

4. The drain trap of claim 1 wherein said sealing end cap and viewport assembly comprises a compression ring, an optically clear disk within said compression ring, and a resilient gasket engageable against said compression ring.

5. The drain trap of claim 1 wherein said means for aligning said cylindrical insert within said cylindrical base portion comprises a resilient gasket registerable on said cylindrical insert.

6. The drain trap of claim 1 wherein said inlet leg has an inlet drain line extending therefrom, said curved outlet portion has an outlet drain line extending therefrom, said curved portion having compression and gasket ring assemblies thereon registerable with said open end of said cylindrical base portion and an outlet drain line respectively extending therefrom.

* * * * *